United States Patent [19]

Suzuki et al.

[11] Patent Number: 4,837,526
[45] Date of Patent: Jun. 6, 1989

[54] SEMICONDUCTOR EXTERNAL OPTICAL MODULATOR

[75] Inventors: Masatoshi Suzuki; Yukio Noda; Yukitoshi Kushiro; Shigeyuki Akiba, all of Tokyo, Japan

[73] Assignee: Kokusai Denshin Denwa Kabushiki Kaisha, Tokyo, Japan

[21] Appl. No.: 42,433

[22] Filed: Apr. 24, 1987

[30] Foreign Application Priority Data

May 7, 1986 [JP] Japan ................................ 61-103055

[51] Int. Cl.⁴ ............................................. G02B 06/10
[52] U.S. Cl. .................................. 332/7.51; 350/96.14
[58] Field of Search ..................... 332/7.51; 350/96.14; 357/16, 17

[56] References Cited

U.S. PATENT DOCUMENTS

| 3,695,745 | 10/1972 | Furukawa | 350/96.14 |
| 3,874,782 | 4/1975 | Schmidt | 350/96.14 X |
| 3,877,781 | 4/1975 | Kaminow | 350/96.14 |
| 3,887,885 | 6/1975 | Hattori et al. | 350/96.14 X |
| 3,962,714 | 6/1976 | King | 357/17 X |
| 4,054,362 | 10/1977 | Baues | 350/96.14 |
| 4,056,304 | 11/1977 | Phillips | 350/96.14 |
| 4,093,345 | 6/1978 | Logan et al. | 350/96.14 X |
| 4,122,407 | 10/1978 | Van Vechten | 357/17 X |
| 4,291,939 | 9/1981 | Giallorenzi et al. | 350/96.14 |
| 4,326,176 | 4/1982 | Aiki et al. | 357/17 X |
| 4,340,967 | 7/1982 | Dixon et al. | 357/17 X |
| 4,376,307 | 3/1983 | Rozzi et al. | 357/17 X |
| 4,439,004 | 3/1984 | Hunsperger et al. | 350/96.14 X |
| 4,525,687 | 6/1985 | Chemla et al. | 357/17 X |

FOREIGN PATENT DOCUMENTS

| 0049517 | 3/1984 | Japan | 350/96.14 |
| 0059321 | 4/1985 | Japan | 350/96.14 |

OTHER PUBLICATIONS

Tada et al., "New Coupled-Waveguide Optical Modulators With Schottky Contacts", J. Appl. Phys., Nov. 1978.

Primary Examiner—Thomas H. Tarcza
Assistant Examiner—Mark Hellner
Attorney, Agent, or Firm—Emmanuel J. Lobato; Robert E. Burns

[57] ABSTRACT

A semiconductor external modulator is disclosed in which the mode of polarization of incident light, the crystal plane of the substrate (the direction of application of an electrical field), the energy gap of the optical waveguide layer, and the direction of travel of light are determined so that, of variations in the real and imaginary parts of the refractive index of the optical waveguide layer which are caused by the application of the electric field to the semiconductor external optical modulator, the variation in the real part of the refractive index may be reduced to substantially zero.

7 Claims, 1 Drawing Sheet

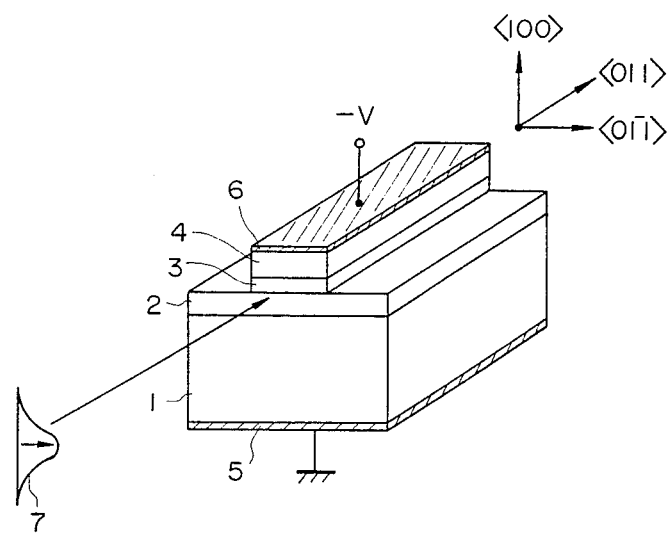

SEMICONDUCTOR EXTERNAL OPTICAL MODULATOR

BACKGROUND OF THE INVENTION

The present invention relates to an optical modulator which modulates the output light from a light emitting source, and more particularly to a semiconductor external optical modulator which is adapted for improving the spectral width of light during high-speed modulation.

By reason of its small size, high efficiency and high reliability, a semiconductor laser has already been put to practical use as the light source for optical fiber communication. Another note-worthy feature of the semiconductor laser is to permit direct modulation, but high-speed direct modulation causes an increase in the spectral width of the semiconductor laser output light, constituting a serious obstacle to long-distance, large-capacity optical fiber communication. An ordinary semiconductor laser which utilizes the cleaved facets oscillates at a plurality of wavelengths during high-speed modulation, and hence it is employed only in the 1.3 μm wavelength band in which the output light is free from wavelength dispersion by the optical fiber but suffers a great loss. On the other hand, since a distributed feedback semiconductor laser, which operates at a single wavelength even during high-speed modulation, is insusceptible to the influence of the wavelength dispersion, it is now being developed intensively for use in the 1.5 μm band in which the loss of the output light is small. It has been clarified, however, that with a modulation rate above 1 Gb/s, even if the laser oscillates at a single wavelength, the spectral width of the output light increases owing to its frequency modulation by the varying injected carrier density, resulting in the problem that the influence of dispersion is non-negligible.

Accordingly, chirping of the oscillation wavelength or the resulting increase in the spectral width during high-speed modulation is unavoidable as long as the semiconductor laser is subjected to direct modulation. In this sense, the external modulation technique is considered promising which allows the semiconductor laser to operate at a single wavelength in the steady state and modulates the output light outside the oscillator. With the external modulation technique, in an ideal case where the static spectral width ($\leq$10 MHz) increase by the width of the modulation band ($\sim$GHz) alone, the increase in the spectral width can be reduced down to about 1/10 that (1 to 3 Å) in the case of the direct modulation.

As such a conventional waveguide type external optical modulation element, directional coupler type and Mach-Zehner interferometer type structures ulitizing a ferroelectric material are mainly attracting attention in terms of the modulation band and the extinction ratio. However, these modulators are defective in that they cannot be integrated with the semiconductor laser, that since they perform intensity modulation of light by changing its phase velocity, their fabrication calls for uniform and precise control of dimensions of the waveguide, and that since the amount of variation in the phase velocity per unit length is small, the device length is as long as several millimeters to several centimeters so as to obtain a required amount of variation in the phase parameter, resulting in a great insertion loss.

To avoid such defects, there has been proposed an electroabsorption type optical modulator which employs a semiconductor material so that, through utilization of an electroabsorption effect unobtainable with the ferroelectric material, an electric field is applied by an external voltage to the optical waveguide layer to change its absorption coefficient, thereby modulating the intensity of light. This optical modulator can be driven at low voltages and is small in length, easy to fabricate and high-speed, and is now attracting attention as an optical modulation element which can be integrated with the laser. It has recently been pointed out, however, that in the absorption type modulator the absorption coefficient and refractive index of its optical waveguide layer both undergo variations with the applied electric field and the intensity modulation is accompanied by a phase modulation, with the result that during the high-speed modulation the spectral width will increase as in the case with the direct modulation of the laser (Koyama and Iga, Electronics Letters, Vol. 21, pp. 1065-1066, No. 1985).

As described above, the conventional semiconductor external optical modulator inevitably increases the spectral width of its output light, and hence has the shortcoming that it cannot be employed in a large-capacity, high-speed optical communication system.

SUMMARY OF THE INVENTION

The present invention has been made as a solution to the abovenoted drawbacks of the prior art, and an object of the invention is to provide a semiconductor external optical modulator which permits the reduction of the spectral width during high-speed modulation and, at the same time, possesses such advantages of the semiconductor optical modulator as a wide modulation band width, a large extinction ratio and a small device length.

The present invention has its feature in that the mode of polarization of incident light, the crystal plane of the substrate (the direction of application of an electric field), the energy gap of the optical waveguide layer, and the direction of travel of light are determined so that, of variations in the real and imaginary parts of the refractive index of the optical waveguide layer which are caused by the application of the electric field to the semiconductor external optical modulator, the variation in the real part of the refractive index may be reduced to substantially zero.

The refractive index of a compound semiconductor layer can be expressed in the form of a complex refractive index, $(n_r+jn_i)$, which is composed of a real part $n_r$ and an imaginary part $n_i$. The real part $n_r$ of the refractive index (hereinafter referred to as the "refractive index $n_r$") and the imaginary part $n_i$ of the refractive index (hereinafter referred to as the "refractive index $n_i$") in the complex refractive index are concerned with the phase and the absorption coefficient (the intensity) of light, respectively. Usually, the application of an electric field to the compound semiconductor layer will cause the both refractive indices $n_r$ and $n_i$ to vary. For example, if only the refractive index $n_r$ is varied, the phase modulation of light which retains its intensity constant is possible, and if only the refractive index $n_i$ is varied, the intensity modulation of light which retains its phase position constant is possible.

In view of the above, the present inventors considered that a semiconductor external optical modulator of a structure in which the application thereto of an electric field would cause an apparent change in the refractive index $n_i$ alone would make it possible to achieve an intensity modulation free from the influence of the phase modulation of light.

Letting variations in the refractive indices $n_r$ and $n_i$ by the application of an electric field be represented by $\Delta n_r$ and $\Delta n_i$, respectively, the ratio $\alpha$ (hereinafter referred to as the "parameter $\alpha$") between the respective variations is expresses as follows:

$$\alpha = \frac{\Delta n_r}{\Delta n_i} \quad (1)$$

For instance, the spectral width $W_0$ in an ideal case where the parameter $\alpha$ is zero (i.e. $\Delta n_r = 0$) becomes minimum only for side-band components by the intensity modulation. In case of a Gaussian type light pulse which is increasingly affected by side-band components resulting from the phase modulation as the parameter $\alpha$ increases, the spectral width $W$ becomes $$W_0 \cdot \sqrt{1 + \alpha^2} .$$

That is, the spectral width could be decreased by reducing the variation $\Delta n_r$ in the refractive index $n_r$ to zero.

Next, a description will be given of the principle of reducing the variation in the refractive index $n_r$ which is caused by the application of an electric field.

The variation $\Delta n_r$ in the real part $n_r$ of the refractive index can be divided into a refractive index variation $\Delta n_b$ due to the electroabsorption effect produced by an interband transition and a refractive index variation $\Delta n_e$ due to a primary electrooptic effect. The refractive index variation $\Delta n_e$ depends upon the mode of polarization of incident light, the direction of travel of light in the optical waveguide layer, the crystal plane of the substrate and the direction of application of the electric field.

For example, in a case where an electric field is applied, in the direction parallel to $<100>$ to an optical waveguide layer in which the direction of travel of light is parallel to $<011>$ or $<01\bar{1}>$, formed on a substrate consisting of a zinc blende type crystal (which has a structure with an icosihexahedron and is also called the crystal of $\bar{4}3$ m symmetry group) having the (100) crystal plane, the refractive index variation $\Delta n_e$ by the electrooptic effect is substantially zero when the incident light is in the TM mode. When the incident light is in the TE mode and the direction of its travel in the optical waveguide layer is parallel to $<01\bar{1}>$, the variation $\Delta n_e$ takes a positive value. Conversely, when the direction of travel of light in the optical waveguide layer is parallel to $<011>$, the variation $\Delta n_e$ takes a negative value.

On the other hand, the refractive index variation $\Delta n_b$ by the electroabsorption effect is based on an inter-band transition, and hence generally assumes a positive value when the difference, $\Delta Eg$ ($=Eg-h\nu$), between the forbidden band gap energy $Eg$ of the optical waveguide layer and the energy $h\nu$ of the incident light is greater than 20 meV and the electric field intensity is less than 150 kv/cm. Conversely, when a difference $\Delta Eg$ ($=Eg-h\nu$) between the band gap energy $Eg$ of the optical waveguide layer and the energy $h\nu$ of the incident light is smaller than 20 meV and the field intensity is more than 150 kv/cm, this variation assumes a negative value. Therefore, according to the present invention, the mode of polarization of the incident light, the direction of its travel in the optical waveguide layer, the energy gap of the waveguide layer, the crystal plane of the substrate, and the direction of application of the electric field are selected so that the refractive index variation $\Delta n_b$ by the electroabsorption effect, which takes a positive (or negative) value, and the refractive index variation $\Delta n_e$ by the primary electrooptic effect, which takes a negative (or positive) value, are cancelled each other, reducing the refractive index variation $\Delta n_r$ to substantially zero. With such an arrangement, since the application of the electric field causes only the refractive index $n_i$ to undergo an apparent change, the output light can be modulated without increasing its spectral width.

BRIEF DESCRIPTION OF THE DRAWINGS

The prefered embodiment of the present invention will be described in detail below with reference to the accompanying drawing, in which:

FIGURE is a perspective view illustrating an embodiment of the semiconductor external optical modulator of the present invention.

DETAILED DESCRIPTION OF THE PREFERRED EMBODIMENT

FIGURE is an embodiment of the present invention, illustrating the basic structure of the semiconductor external modulator.

In FIGURE, reference numeral 1 indicates an $n^+$-type InP substrate whose crystal plane is (B 100), 2 an $n^-$-type InGaAsP optical waveguide layer whose band gap energy is about 20 to 70 meV higher than the photon energy ($h\nu$), 3 an $n^-$-type InP upper clad layer, 4 a $p^+$-type InP layer, 5 an n-side electrode, 6 a p-side electrode, and 7 TE-polarized incident light which travels in the direction parallel to $<011>$ direction. This embodiment employs a strip loaded structure for confining light in the waveguide layer laterally thereof. For example, in a case where the wavelength of the incident light is 1.55 $\mu$m, the carrier concentration of the optical waveguide layer 2 whose band gap energy is about 50 meV higher than that of the incident light is $1 \times 10^{15}$ cm$^{-3}$, the thickness of the waveguide layer is 0.3 $\mu$m, the carrier concentration of the upper clad layer 3 is $1 \times 10^{15}$ cm$^{-3}$, its thickness is 0.1 $\mu$m, and a voltage of 2 V is applied across the electrodes 5 and 6, the parameter $\alpha$ ($\Delta n_r / \Delta n_i$) becomes approximately 0.1, and the increase in the spectral width by the phase modulation is substantially negligible. Furthermore, the voltage application of 2 V provides a mean electric field intensity of 77 KV/cm, and since the effective electric field intensity is 46 KV/cm, taking the optoelectric field distribution into account, and since the absorption coefficient is 72 cm$^{-1}$, the device length for obtaining an extinction ratio of 20 dB may be 640 $\mu$m or so. Moreover, if the strip loading portion of the optical waveguide layer 2 is made 3 $\mu$m wide, the electrostatic capacitance of the wveguide layer is 0.6 pF, permitting a high-speed modulation over a modulation frequency band width greater than 10 GHz.

While in the above the present invention has been described in connection with the case of employing materials of the InP series, the invention is also applicable to other compound semiconductor layers of the GaAs series and the like, as long as they have the zinc blende type crystal structure. The optical waveguide layer may also be of an MQW structure, and it is not limited specifically to the strip loading type but may also be a buried or rib type optical waveguide. The following Tables 1 to 4 show the relationship among the crystal plane normal to the direction of an applied electric field of the substrate, the direction of travel of light, and the mode of polarization of incident light for use in the present invention.

TABLE 1

| Crystal-plane of substrate | Direction of travel of light | Mode of polarization of incident light |
|---|---|---|
| (100) | parallel to <011> | TE |
| (111) | perpendicular to <111> | TE |

TABLE 2

| Crystal plane of substrate | Direction of travel of light (parallel to) | Mode of polarization of incident light |
|---|---|---|
| (100) or ($\bar{1}$00) | <011> <0$\bar{1}$1> | TE |
| (001) or (00$\bar{1}$) | <110> <$\bar{1}$10> | TE |
| (010) or (0$\bar{1}$0) | <101> <$\bar{1}$01> | TE |

TABLE 3

| Crystal plane of substrate | Direction of travel of light | Mode of polarization of incident light |
|---|---|---|
| (100) | parallel to <01$\bar{1}$> | TE |
| (111) | perpendicular to <111> | TM |

TABLE 4

| Crystal plane of substrate | Direction of travel of light (parallel to) | Mode of polarization of incident light |
|---|---|---|
| (100) or ($\bar{1}$00) | <01$\bar{1}$> or <0$\bar{1}$1> | TE |
| (001) or (00$\bar{1}$) | <$\bar{1}$10> or <1$\bar{1}$0> | TE |
| (010) or (0$\bar{1}$0) | <10$\bar{1}$> or <$\bar{1}$01> | TE |

Table 1 shows typical examples which can be employed in the present invention. Table 2 shows cases equivalent to the (100) crystal plane of the substrate in Table 1. In the zinc blende type crystal is an icosihexahedron as mentioned previously, and this indicates that the relationships shown in Table 1 are also applicable to the case of a substrate having a crystal plane equivalent to the (100) one, that is, the crystal plane having threefold rotational symmetry along the <111> crystal axis. Similarly, the relationship for the (111) crystal plane in Table 1 is applicable to the case of a substrate of a crystal plane having fourfold rotational symmetry along the <100> crystal axis.

Table 3 shows the respective relationships in a case where the real part of the refractive index is apparently reduced to zero by decreasing the refractive index change due to the electric absorption effect and increasing the refractive index change due to the electrooptic effect when the applied voltage is above 150 KV/cm and a difference $\Delta$Eg between the band gap energy of the optical waveguide layer and the energy of the incident light is smaller than 20 meV, as opposed to the embodiment. Table 4 shows in detail the conditions for substrates of crystal planes equivalent to the (100) plane in Table 3.

Incidentally, the present invention is also applicable to substrates of crystal planes equivalent to the (111) direction.

As described above, by determining the energy gap of the optical waveguide layer 2, the crystal plane of the substrate normal to the direction of the applied electric field and the mode of polarization and direction of travel of incident light, the semiconductor external optical modulator of the present invention keeps the spectral width from increasing under the influence of the phase modulation, and hence is capable of achieving the intensity modulation of light while keeping its spectral width small. Accordingly, the present invention is applicable to a large-capacity, high-speed optical transmission system as well and is of great utility in practice.

What we claim is:

1. A semiconductor external optical modulator for modulating a light output of a light emitting source comprising, a substrate, an optical waveguide layer for propagation therethrough of incident light, a clad layer having a refractive index smaller than that of said optical waveguide layer, electrodes for applying an electric field, and an absorption coefficient of the optical waveguide layer being varied by application of said electric field across said electrodes, for changing the intensity of the incident light, characterized in that said substrate has a zinc blende type crystal structure, and the crystal direction of the substrate parallel to the direction of the applied electric field, the mode of polarization and the direction of travel of the incident light, and the energy gap of the optical waveguide layer being selected so that variations in the refractive index of the optical waveguide by electroabsorption effect and by electrooptic effect cancel each other, whereby variation in the real part of the refractive index of the optical waveguide layer is reduced to substantially zero.

2. A semiconductor external optical modulator according to claim 1, in which the substrate has a crystal plane, and said crystal plane of the substrate is (100).

3. A semiconductor external optical modulator according to claim 2, in which the direction of travel of light is parallel to <011> and the mode of polarization of incident light is TE.

4. A semiconductor external optical modulator according to claim 2, in which the direction of travel of light is parallel to <01$\bar{1}$> and the mode of polarization of incident light is TE.

5. A semiconductor external optical modulator according to claim 1, in which the substrate has a crystal plane, and said crystal plane of the substrate is (111).

6. A semiconductor external optical modulator according to claim 5, in which the direction of travel of light is perpendicular to <111> and the mode of polarization of incident light is TE.

7. A semiconductor external optical modulator according to claim 5, in which the direction of travel of light is perpendicular tò 21 111> and the mode of polarization of incident light is TM.

* * * * *